United States Patent
Herbstman et al.

(10) Patent No.: US 6,683,613 B1
(45) Date of Patent: Jan. 27, 2004

(54) MULTI-LEVEL SIMULATION

(75) Inventors: David F. Herbstman, Seattle, WA (US); David P. Simons, Seattle, WA (US); Daniel M. Wilk, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 09/221,269

(22) Filed: Dec. 23, 1998

(51) Int. Cl.[7] .............................................. G06T 15/00
(52) U.S. Cl. .................................................... 345/475
(58) Field of Search ............................... 345/473, 474, 345/475

(56) References Cited

U.S. PATENT DOCUMENTS 6,061,072 A * 5/2000 Rouet et al. ................ 345/473
6,115,051 A * 9/2000 Simons et al. .............. 345/442

OTHER PUBLICATIONS

Tu et al (Artificial Fishes: Physics, Locomotion, Perception, Behavior; Department of Computer Science, University of Toronto; Proceedings of the 21st annual conference on Computer graphics and interactive techniques, Jul. 1994).*

Reynolds "Flocks, Herds, and Schools: A distributed behavioral model": ACM 0–89791–227–6/87/007/0025: Jul. 1987.*

Singla et al. "Temporal Notions of Synchronization and Consistency in Beehive": ACM 0–89791–890–8/97/06: Jun. 1997.*

"The QuickTimeVR Book": Susan A. Kitchens: ISBN: 0–201–69684–3; 1998.*

* cited by examiner

Primary Examiner—Almis R. Jankus
(74) Attorney, Agent, or Firm—Fish & Richardson P.C.

(57) ABSTRACT

A method of integrating two independent simulations including running a first simulation simulating changes in an object over time. The first simulation includes a first simulation output reflective of a state of the first simulation at one or more predefined times. A second simulation is run concurrently simulating changes in a second object over time. An interaction between the first and second simulations is defined resulting in an integrated simulation output without affecting the first simulation state.

41 Claims, 5 Drawing Sheets

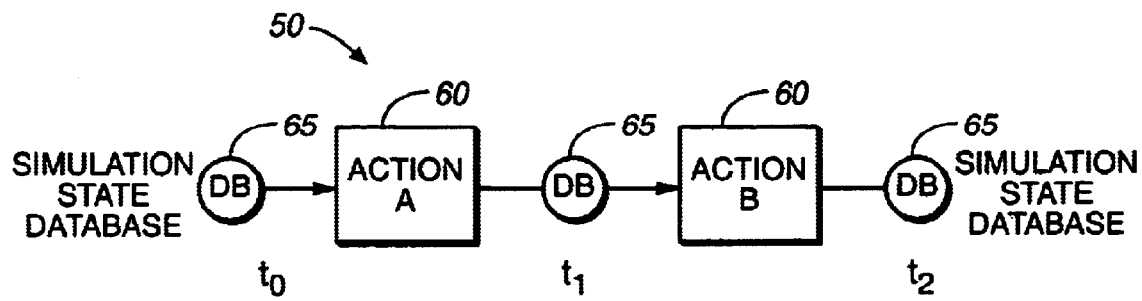
FIG._1
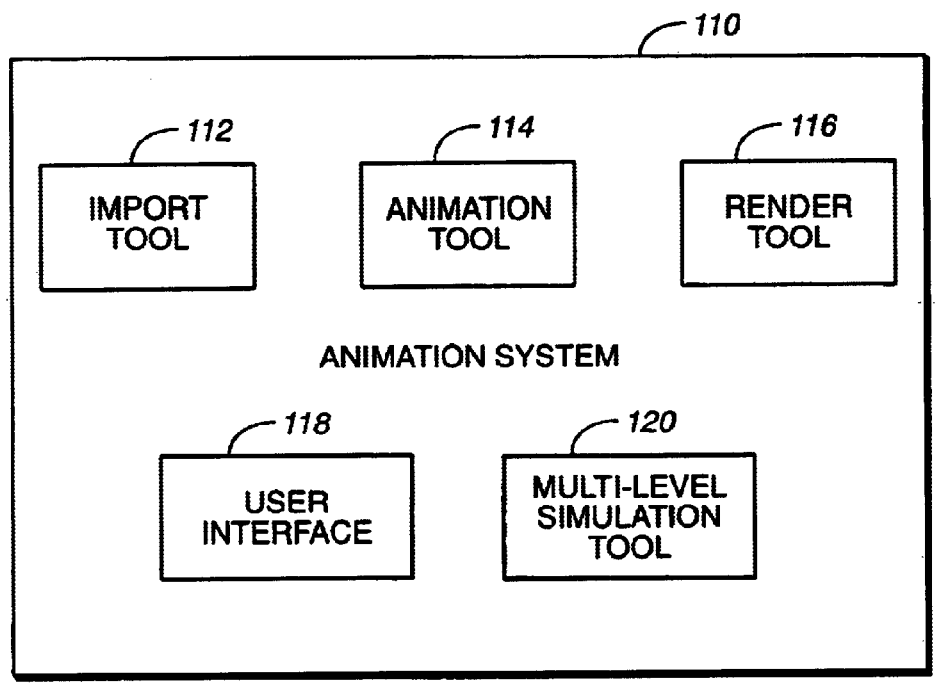
FIG._2

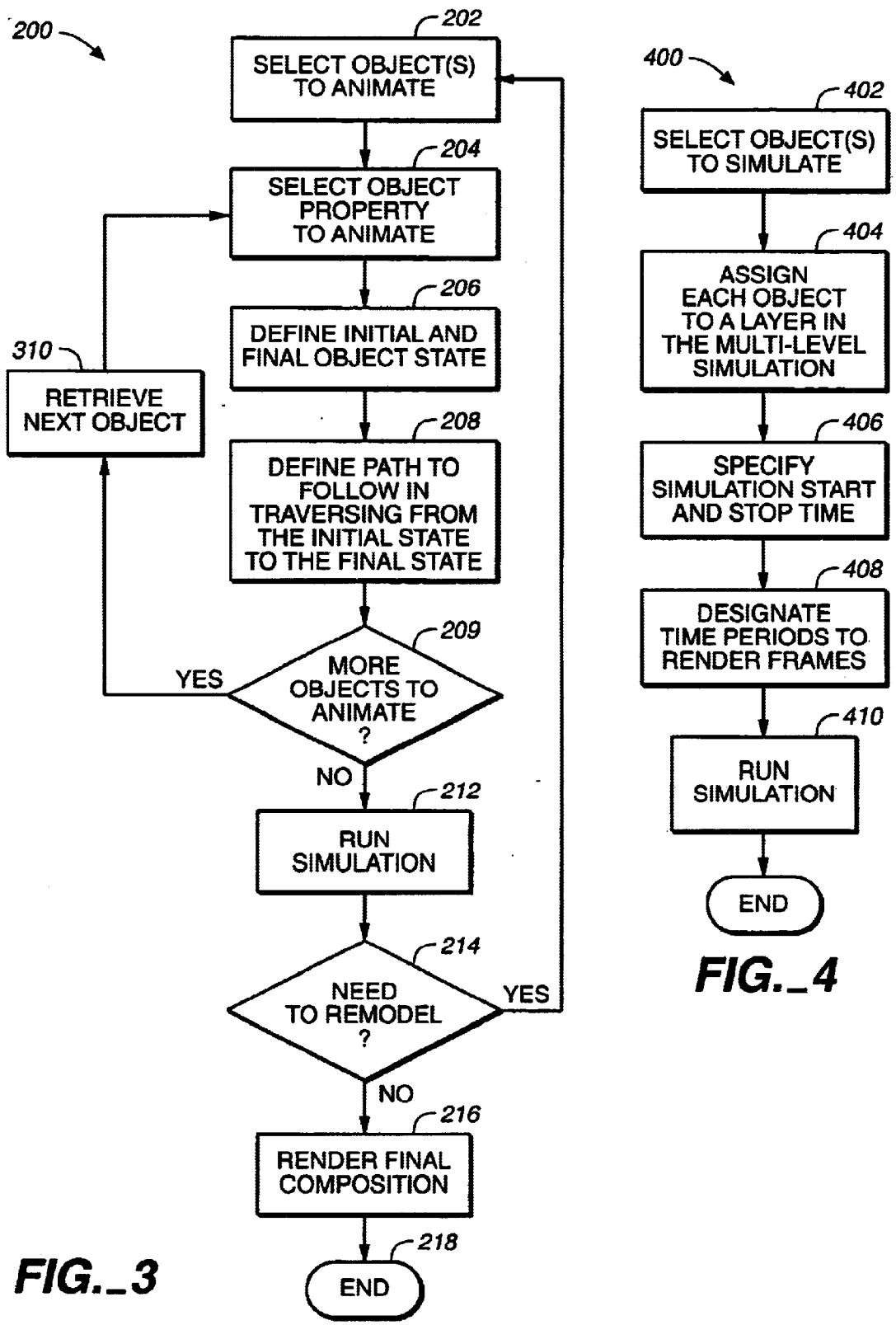
FIG._3
FIG._4

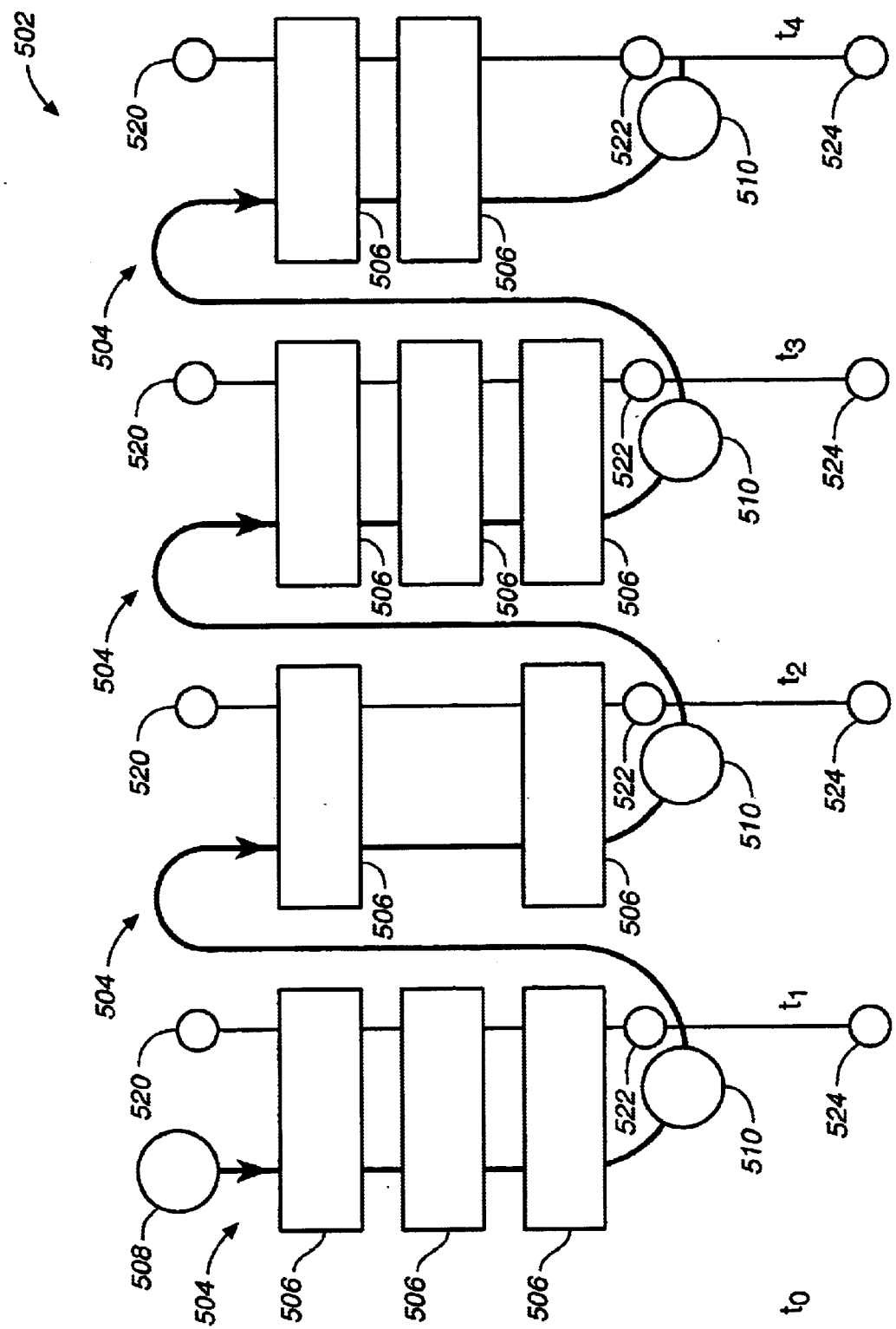
FIG._5A

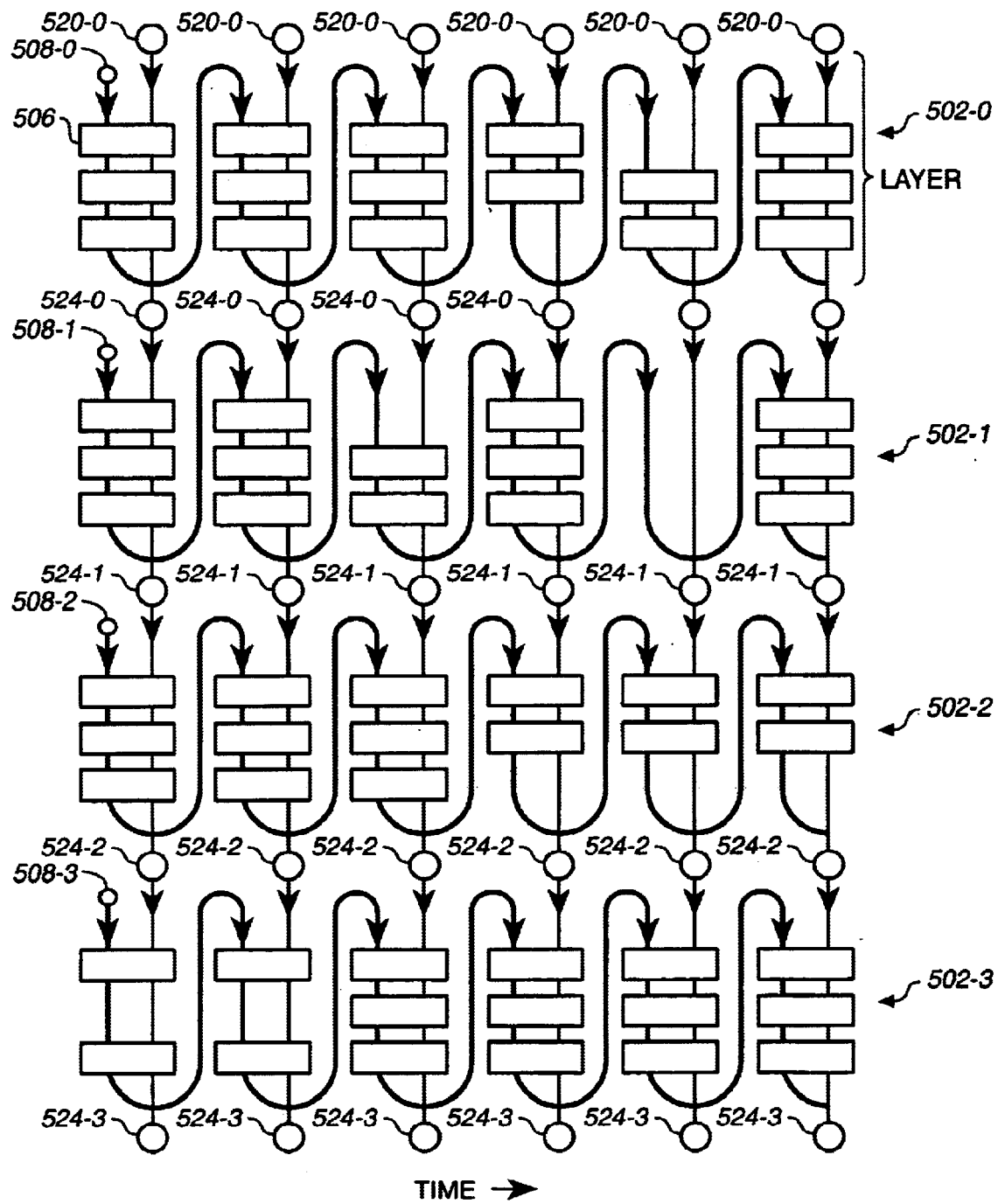
TIME →
FIG._5B

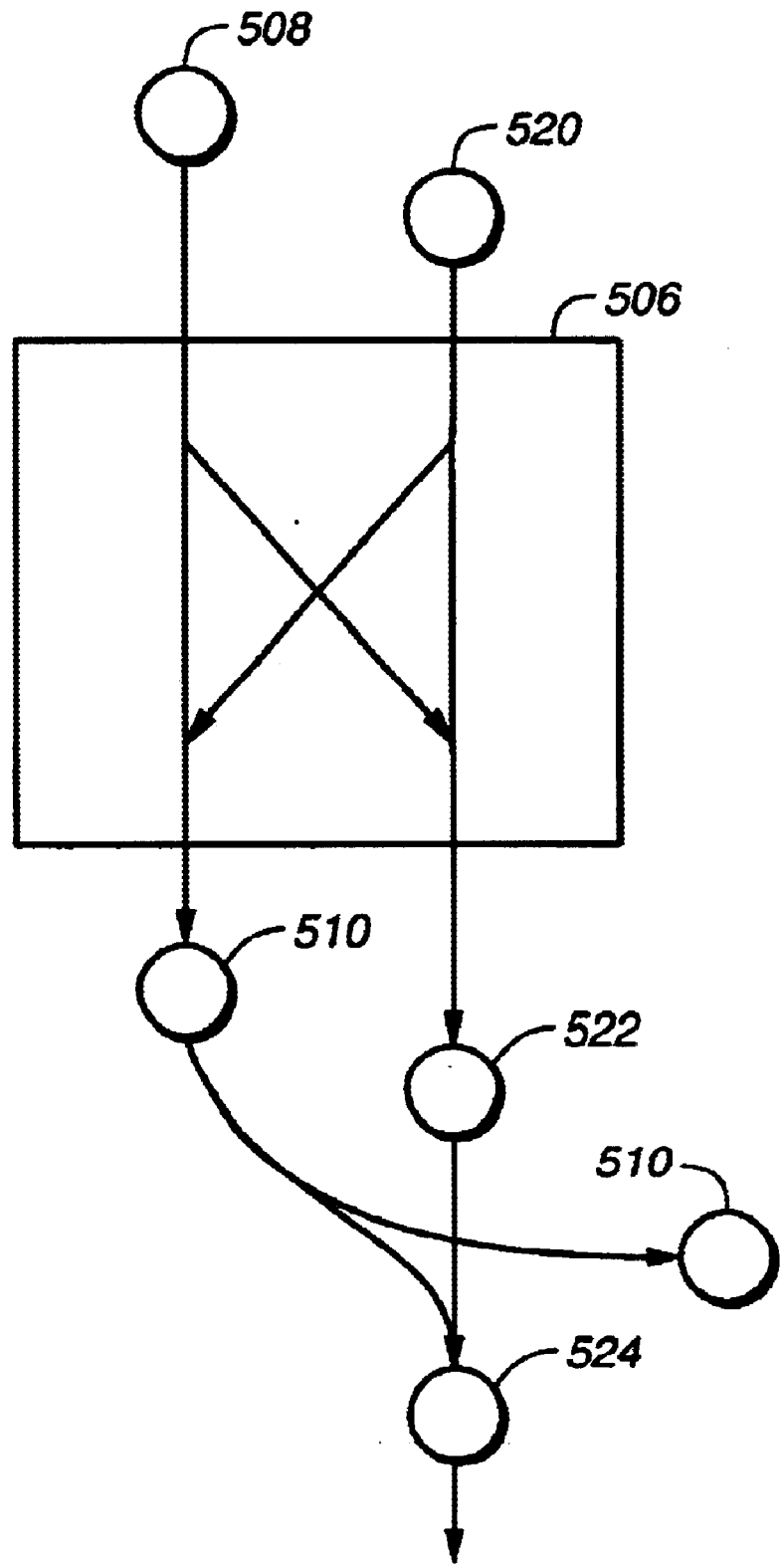
FIG._5C

MULTI-LEVEL SIMULATION

BACKGROUND OF THE INVENTION

The present invention relates generally to systems for generating graphics and more particularly to methods and apparatus for rendering images from a multi-path simulation model.

Programmed computers can be used to edit and create movies. For example, a computer program called After Effects available from Adobe Systems Incorporated of Mountain View, Calif., provides its user the ability to edit and create movies by integrating and arranging pieces of footage. In such programs, the process of creating a movie typically occurs in two major stages: modeling and rendering.

Modeling is the process of creating a structure for a movie project, commonly called a composition, by defining the arrangement and timing of imported footage. A composition is essentially a set of instructions that define the processing of footage pieces in space and time in formation of a movie. Each composition includes the definition of one or more layers which are place holders for pieces of footage. Modeling includes the subprocesses of importing footage into layers, editing the footage, arranging or compositing the footage and animating objects or applying other effects to the composition layers.

Imported footage may be of the form of video pictures, animations, drawings, stills, photographs or computer generated images. Each piece of imported footage is assigned to a layer. Compositing integrates the footage of respective layers using geometry masks, transparency information and effects. As the layers of a composition are integrated, animation and other effects can be applied to each layer.

To create a final output, such as a film or video tape for reviewing, the composition must be rendered. The rendering process transforms the footage instructions associated with each layer into fixed video frames. During the rendering process, corresponding pixels from each layer are composited on top of each other to create a final image, a frame at a time, in the output format requested by the user. The frames may then be written for either analog or digital storage to a recording device, such as a video tape recorder, photograph film recorder or digital disk recorder. In this way, a movie is produced.

Animation, as described above, is a subprocess of the modeling stage. Animation techniques allow a user to create apparently spontaneous lifelike movement of objects in the composition. Most movie systems allow a user to animate an object (i.e., a layer) by specifying a path of the object as it moves in a two or three dimensional space. The path is typically represented by a curve Q. Motion along this curve Q can be described by a single function (e.g., u as a function of time where u is the natural parameter of the function defining Q).

Often the process of creating a composition requires many iterations of the various modeling steps before a final product is produced. Simulation techniques may be used to model the behavior or action that is performed in a composition and speed the progression toward a final product. A traditional simulation model includes a linear progression of acting agents that operate on state information to produce an output or resultant state, where successive acting agents operate on the output produced by an acting agent just previous in time. The acting agents typically define functions that perform one or more operations on the data.

Referring now to FIG. 1, a traditional simulation model 50 includes a series of actions that are applied over a window of time. Individual frames may be rendered at specific time intervals to create the frames which are to be used in generating a movie output. Typically the process is a serial process and incremental changes to the simulation state output are applied as each action is executed at a given time interval. More specifically, the traditional simulation model follows a track 50 comprised of a plurality of actions 60. An action 60 is a process that operates on a simulation state database or SOUP 65. At any given time interval, the simulation state database is a particular set of defined attributes and values that is indicative of the simulation state. The simulation state database is typically a collection of dots where each dot is a collection of attribute pairs. For example, the simulation state database may contain hundreds of dots where each dot may contain a horizontal position attribute and its corresponding value, a vertical position attribute and its corresponding value as well as a color (red attribute and a value, green attribute and a value, and blue attribute and a value).

As described above, an action 60 is the process that operates on the simulation state database (i.e., the SOUP is both an input and an output). The action can add dots, remove dots, or modify one or more attributes or one or more values in the simulation state database. An action 60 can include one or more acting agents (not shown). An acting agent is a process that effects the simulation. Examples of actions or acting agents are gravity and wind. In traditional simulation modeling, all acting agents leave a permanent result. That is, when applied to the simulation state database, they leave an effect which is passed to the next action at a next time interval in the track.

However, it is often desirable, especially for animation systems, to create temporary results. In other words, typical simulation techniques do not allow the possibility to create intermediate events within a flow of actions such that the intermediate events have a defined lifetime existence separate from the overall flow of events.

SUMMARY OF THE INVENTION

In general, in one aspect, the invention features a method of integrating two independent simulations and includes running a first simulation simulating changes in an object over time. The first simulation includes a first simulation output reflective of a state of the first simulation at one or more predefined times. A second simulation is run concurrently simulating changes in a second object over time. An interaction between the first and second simulations is defined resulting in an integrated simulation output without affecting the first simulation state.

Aspects of the invention include numerous features. The second simulation can provide a second simulation output reflective of a state of the second simulation at one or more predefined times. The step of defining the interaction results in the integrated simulation output without affecting the second simulation state. The integrated simulation output combines the second simulation output and a modified first simulation output where the modified first simulation output is produced by the operation of the second simulation on the first simulation output.

The method further includes running a third simulation concurrently simulating changes in a third object over time and defining an interaction between the first, second and third simulations resulting in a second integrated simulation output without affecting the first or the second simulation state. The third simulation provides a third simulation output reflective of a state of the third simulation at one or more predefined times. The second integrated simulation output combines the third simulation output and a modified first integrated simulation output where the modified first integration simulation output is produced by the operation of the third simulation on the integrated simulation output.

Each of the first and second simulations simulate the animation of a layer in a multi-layer composition. The second simulation animates a property of the object associated with the first simulation.

In another aspect, the invention provides a method of integrating independent simulations including defining a first and second simulation. Each simulation runs concurrently and includes a plurality of actions defining the progression of a simulation over time and a simulation output reflective of a state of a simulation at prescribed times during the simulation. An interaction between the first and second simulations is defined including a direction of influence where the direction of influence defines how the simulation output from the first simulation is combined with the simulation output from the second simulation at each time in the second simulation.

Aspects of the invention include numerous features. The step of defining an interaction includes providing the simulation output from the first simulation as an input to the second simulation, operating on the first simulation output in the second simulation to produce a modified first simulation output and combining the modified first simulation output and the simulation output of the second simulation to produce a integrated simulation output.

The integrated simulation output can be rendered to produce a frame of data for display. The integrated simulation output for a given time is provided to a next action in the second simulation. Only the simulation output from the second simulation at a given time can be provided to a next action in the second simulation.

In another aspect, the invention provides a method of integrating independent simulations to produce a multi-level simulation including defining a first and second simulation where each simulation runs concurrently and includes a plurality of actions defining the progression of a simulation over time and a simulation output reflective of a state of a simulation at prescribed times during the simulation. An interaction between the first and second simulations is defined. The simulation output from the first simulation is provided as an input to the second simulation. The first simulation output in the second simulation is operated on to produce a modified first simulation output. The modified first simulation output and the simulation output of the second simulation are combined to produce a integrated simulation output. The integrated simulation output is rendered to produce a frame of data for display.

In another aspect, the invention provides a method of integrating two independent simulations and includes providing a first and second layer where each layer specifies separate but concurrent simulations and includes a plurality of actions defining the progression of a simulation over time. Each action includes a layer state input, a function, and a resultant layer state output where the application of the function to the layer state input results in the resultant layer state output. An interaction between the first and second simulations is defined. The interaction includes providing as an input to the second layer the first layer's resultant state output, operating on the first layer's resultant state output by actions specified in the second layer to produce a modified resultant state output for the first layer and combining the resultant state output for the second layer with the modified resultant state output from the first layer to produce an integrated simulation state output. The integrated simulation state output is rendered producing a frame for display.

Aspects of the invention include numerous features. The combining step copies the resultant state output without affecting output produced by the second layer. Either of the resultant state outputs for the first or second layer can be rendered to reflect the state of either simulation at a given time. Rendering includes displaying an image representative of an interaction of the first and second layers at a particular time.

In another aspect, the invention provides a simulation tool for providing multi-level simulations of concurrently running simulations and includes a simulation engine operable to designate a first and second simulation each including a simulation output, to copy a simulation output from a first simulation and provide the copy of the first simulation output to the second simulation resulting in application of actions specified in the second simulation at a same time interval to the first simulation output thereby producing a modified first simulation output, and to combine the modified first simulation output and a second simulation output for a predefined time producing an integrated simulation output. A render designation tool is included for designating one or more times for rendering the integrated simulation output to produce a frame for display representative of the interaction of the first and second simulations.

In another aspect, the invention provides a method for animating an object that includes selecting a property of the object to animate, animating the property over a time interval including updating a value of the property and defining and animating an ephemeral property of the object over the time interval where the value of the ephemeral property is determined from the value of the property at a same time and an associated function. A first simulation is run simulating an animation of the property producing a first simulation output reflective of a state of the first simulation at predefined times. A second simulation is run concurrently simulating an animation of the ephemeral property producing a second simulation output reflective of a state of the second simulation at the predefined times without affecting the state of the first simulation. A frame of data is rendered at the predefined times during the time interval using the second simulation output whereby the ephemeral property is animated for each individual frame without affecting underlying values of the property produced by the first animation.

Advantages of the present invention include one or more of the following. The invention provides more control than provided by traditional simulation environments. The invention provides an added element of "non-destructiveness" to the simulation environment, which allows references from one point in a simulation to any point previous in execution time or real simulation time. Other advantages and features will be apparent from the following description and from the claims.

BRIEF DESCRIPTION OF THE DRAWING

FIG. 1 is a block diagram of a prior art simulation modeling process.

FIG. 2 is a block diagram of an animation system according to the invention.

FIG. 3 is a flow diagram of an animation process according to the invention.

FIG. 4 is a flow diagram of a simulation process according to the invention.

FIGS. 5a–b is a block diagram of a multi-level simulation architecture according to the invention.

FIG. 5c is a block diagram of an action in a multi-level simulation model according to an alternative implementation of the invention.

DETAILED DESCRIPTION

The present invention may be embodied in any system that performs a simulation with a system state at a given time that is determined by the system state a moment before. For example, the present invention has applicability to weather systems, fireworks simulation systems or traffic simulation systems. The invention has particular applicability to animation systems and will be described in terms of an embodiment in such a device, which will be simply reformed to as an animation system.

Referring now to FIGS. 2 and 3, an animation system 110 receives input from a user and transforms the input into video output frames for display in a movie. The animation system 110 includes tools for animating objects in a composition including an import tool 112, animation tool 114, render tool 116, a user interface 118 and multi-level simulation tool 120.

Import tool 112 retrieves and places content into a composition. Import tool 112 can include a selection tool (not shown) for selecting a particular piece of content as well as methods for loading content from local and remote sites.

Animation tool 114 includes methods and processes for animating an object in the composition. Animation tool 114 is discussed in greater detail below.

Render tool 116 renders a frame of data representative of the composition at a particular time. Render tool 116 produces video output frames for display in a movie.

User interface 118 includes a graphical user interface which is manipulated by various tools in animation system 110 to produce visual display for guiding a user in the creation and display of a composition.

Multi-level simulation tool 120 includes methods and processes for invoking concurrent simulations for multiple objects in the composition. A process for simulating a composition is shown in FIG. 4.

In a process 200 of animating an object(s) in a composition, a user selects an object using a selection tool (not shown), such as layer in a movie composition for animation (202). The user designates a particular object property to be animated using the animation tool (204). Object properties that can be animated include layer position, anchor point, effect point controls and color selection.

Another type of property that can be animated is a layer map. A layer map is used to control the interaction of an associated layer with other layers. More specifically, a layer map controls what happens when a pixel in a layer is passed over by another pixel, for example, from another layer. The layer map includes a user specified or default operation for defining the interaction of the pixels. Examples of operations include addition, differentiation, set, subtraction, multiplication, minimization and maximization. A layer map can itself be animated over time.

In one implementation a property mapper is used to control specific properties of an individual object. A property of an object can be modified in either a persistent or an ephemeral way in an animation. A persistent change to a property retains the most recent value set by a layer map for the remaining life span of the object, unless modified by another operator (action). An ephemeral change to an object property reverts the property to its original value after the change has been applied and a frame is rendered capturing the change. For example, if a layer map is used to modify an object's size and subsequently the layer map is animated so that it exits the frame, the object returns to its original size value as soon as no layer map pixels correspond to it. A persistent property manager can be used to persistently maintain the state of the properties associated with a layer consistent with changes applied during the course of the animation. An ephemeral property mapper can be used to maintain the original state of the properties for an object while changes are temporally applied during the course of the animation.

The user defines an initial object property state and a final object property state, such as a starting and ending position of the object as it travels in a display area (206). Thereafter the user may define a path in the property space of the object that the object will follow between the starting and ending property states (208). A user may desire to animate more than one object for display to create a final composition (209). Accordingly, the animation process steps may be repeated for each object to be animated (210).

A simulation of the final composition can be invoked to simulate the interaction of the various objects contained within a composition (212). Depending on the simulation results, remodeling or re-animation may be performed (214). When the simulation results are satisfactory, a final composition output may be rendered (216) and the process ends (218).

Referring now to FIG. 4, multi-level simulation tool 120 can be used to invoke a multi-level simulation process 400 that includes a user specification of object(s) whose animation is to be simulated (402). Each object is assigned to a layer in a multi-level simulation (404). The user specifies the start and stop time for the simulation (406) and designates one or more times at which a simulation state "snap-shot" is to be captured by the render tool and rendered as a video frame (408). Finally, the simulation is invoked (410).

Referring to FIG. 5a, simulation tool 120 operates on requests received from the user to simulate object animation creating a multi-level simulation that defines the interaction of two or more concurrently running simulations. A multi-level simulation model is created that includes two or more simulations and the interaction therebetween. Each object to be simulated is assigned to a simulation track 502. An example of an object whose animation can be simulated is a layer in a multi-layer composition.

Each track 502 includes a linear series of operations 504 that describe the animation effects to be applied to a given object from the user designated start time to end time for the simulation. During any time interval, zero or more actions 506, as defined using the animation tool, can be applied to the object (e.g., from time $t_0$ to time $t_{next}$). Actions can define the motion of the object in display space or the application of one or more effects to the object. Examples of effects include wind, gravity, repel, wall, or explosion effects. An action may include the manipulation of one or more properties associated with a given object. A property mapper, either persistent or ephemeral, can be used to control the animation process as applied to the specific properties associated with an object.

At a start time $t_0$ the object is defined by an initial object state 508. The initial object state 508 includes attributes and information that describe the state of the object as of time $t_0$ and prior to the execution of any actions defined in the interval between $t_0$ and $t_1$.

At time $t_1$, one or more actions 506 have been applied to the object to produce an animation effect. The result of the operation of the actions 506 on the initial object state 508 is a resultant object state 510. The resultant object state 510 can be rendered to provide a visual frame for display to a user of the state of the simulation track 502 at a particular time during the simulation execution. The resultant object state 510 is provided as an input to a next operation 504 in track 502. As described above, a track 502 defines the progression of a simulation over time. At each time interval one or more actions are applied to the object state producing a new resultant object state which may be rendered by render tool 118 to produce a visual display. At the end of the simulation, a final output state for the simulation track can be rendered to produce a frame for display to the user.

A simulation track 502 also includes interaction state information. Simulation tool 120 allows a user to define a multi-level simulation to integrate two or more concurrently running simulations. More specifically, each simulation track includes an integration state 520 which is provided as an input at each operation 504. The integration state 520 is provided from a simulation track at one hierarchical level higher in a multi-level simulation. The integration state 520 includes object state information for each simulation layer that is higher in the hierarchical structure. As an operation 504 is invoked in a simulation track 502, the integration state is operated on by each action 506 to produce a modified integration state 522. The modified integration state 522 reflects the effects applied by the various actions defined over a given time interval in the current simulation track to the integration state 520. For example, one action 506 may be a gravity effect. Gravity effects may be applied to the simulation layer state information that is included in the integration state 522, effectively applying gravity to the objects that are included in the simulations at higher hierarchical levels in the multi-level simulation model. The application of the gravity effect to the integration state 520 creates a modified integration state 522.

To integrate the simulations, simulation tool 120 copies the resultant object state 508 into the modified integration state 520 to create resultant integration state information that is passed to the next lower hierarchical level in the multi-level simulation. The resultant integration state 524 includes state information for each layer above the current simulation layer as well as the state of the current simulation layer. The resultant integration state 524 may be rendered by the render tool to produce a frame representative of the integration of the current simulation layer and the higher levels in the multi-level simulation hierarchy. The interaction of the resultant integration state 520 and the resultant object state 508 is described in greater detail below.

Referring to FIG. 5b, a multi-level simulation model 530 is shown. Each object is assigned to a particular track 502. The first layer in a simulation includes a track 502-0 defining the animation of an object over the time interval $t_0$ to $t_{end}$. In one implementation, the first track in a multi-level simulation includes no initial integration state 520. The resultant object state 510-0 is copied directly into the "empty" integration state 520 to produce a resultant integration state 524-0. The resultant integration state 524-0 defining the resultant state of the object animated in track 502-0 is provided as an input to a next lower layer 502-1 in the multi-level simulation architecture.

Layers are used to specify separate but concurrent simulations. The output of a layer is used as an input to effect and interact with a lower layer (one that executes after it), but without any permanent changes to the upper layer simulation. For example, the actions acting at a given time on a lower layer receive the previous state information of the given lower layer and that of layers above the lower layer in the current simulation. The resulting state produced by an action in a lower layer, however, never goes back up to any layers above but only to the next operation (state) in the current layer and any layers below.

The second layer in a multi-level simulation includes a track 502-1 defining the animation of a second object over the time interval $t_0$ to tend. The second track includes an initial object state 508-1 and integration state 520-1 (that is equal to the resultant integration state 524-0) which is provided from the first layer in the multi-level simulation. Actions over a given time interval are applied to both the object state 508-1 and the integration state 520-1 to produce a resultant object state 510-1 and modified integration state 522-1, respectively. The resultant object state 510-1 is passed as an input (object state input 508-1) to the next operation in the current simulation track 502-1. The resultant object state 510-0 is also copied directly into the modified integration state 522-1 to produce a resultant integration state 524-1. The resultant integration state 524-1 defining the resultant state of the integration of the objects animated in track 502-0 and track 502-1 is provided as an input to a next lower layer 502-2 in the multi-level simulation architecture.

At a user defined time, incremental effects produced by actions specified in a simulation as well as the interaction of the objects specified in the concurrent simulations can be captured and rendered. More specifically, the state of a current individual simulation can be viewed by rendering the resultant object state 510 at a given time. Similarly, the state of the interaction of one or more layers in the multi-level simulation can be viewed by rendering the resultant integration state 524 at a given time.

Each simulation progresses in parallel while the layer state information is provided in a flow down mechanism to the next layer as an input from above. In one implementation, the resulting state flows both down as well as across a simulation. Note that if the resulting state information is not restricted from moving both down and to the right that information may "meet itself". That is, the state information flowing right and then down may meet up with information that flows down and then right. To prevent a buildup or flow error, state information that flows down may be restricted to not flow to the right and vice versa. In addition, information that flows right may be copied into the downward flow after each action is finished.

Referring now to FIG. 5c, each action 506 may include a cross talk path to allow for the interaction of the integration state information and the object state information. More specifically, at each action, after the effect of the action has been applied to both the object in the current simulation layer and the integration state information, the object state and integration state may be copied into the integration state and the object state, respectively. In this way, the output from an action which is passed to a next operation in a current simulation may be configured to include both current object state information as well as the state information from the integration.

Alternatively, object state or integration state information may be moved from a layer into the integration or conversely from an integration into an individual layer. That is, an action may include the removal of object state information from a simulation layer (or removal of data from the integration state). More interestingly, the same or another action can allow for the placement of the removed object state information into the integration (or into the simulation layer) without affecting the individual simulation layer. For example, a layer can include animation for a plurality of objects, one of which may be removed by an action in the layer simulation. As the layer simulation moves forward to a next time interval, the object is no longer present in the object state information passed to a next action at a next time interval in the layer. However, a user may desire to keep the removed object in the integrated simulation. Accordingly, by adding the object into the integration state, the removed object can be passed down into a next layer and be operated on in a next time interval by any of the lower layers in the multi-level simulation.

While the invention has been described in terms of specific embodiments which should not be construed as limiting.

What is claimed is:

1. A method of integrating two independent simulations comprising:

running a first simulation simulating changes in a first object over time, the first simulation including one or more first actions to be applied to the first object during the first simulation, the first simulation further including a first simulation output reflective of a state of the first simulation at one or more predefined times;

running a second simulation concurrently simulating changes in a second object over time, the second simulation including one or more second actions to be applied to the second object during the second simulation; and defining an interaction between the first and second simulations including applying one or more second actions associated with the second simulation to the first object, the interaction between the first and second simulations resulting in an integrated simulation output without affecting the first simulation state.

2. The method of claim 1 where the second simulation provides a second simulation output reflective of a state of the second simulation at one or more predefined times.

3. The method of claim 2 where the step of defining the interaction results in the integrated simulation output without affecting the second simulation state.

4. The method of claim 2 where the integrated simulation output combines the second simulation output and a modified first simulation output, the modified first simulation output being produced by the operation of the second simulation on the first simulation output.

5. The method of claim 2 further including running a third simulation concurrently simulating changes in a third object over time where the third simulation provides a third simulation output reflective of a state of the third simulation at one or more predefined times; and defining an interaction between the first, second and third simulations resulting in a second integrated simulation output without affecting the first or the second simulation state.

6. The method of claim 5 where the second integrated simulation output combines the third simulation output and a modified first integrated simulation output, the modified first integration simulation output being produced by the operation of the third simulation on the integrated simulation output.

7. The method of claim 1 where each of the first and second simulations simulate the animation of a layer in a multi-layer composition.

8. The method of claim 1 where the second simulation animates a property of the first object associated with the first simulation.

9. A method of integrating independent simulations comprising:

defining a first and second simulation, each simulation running concurrently and including one or more actions defining a progression of a simulation over time, each simulation including a simulation output reflective of a state of a simulation at prescribed times intervals during the simulation; and defining an interaction between the first and second simulations including a direction of influence, where the direction of influence defines how the simulation output from the first simulation is combined with the simulation output from the second simulation at one or more of the prescribed time intervals in the second simulation to prevent a flow error.

10. The method of claim 9 where the step of defining an interaction includes:

providing the simulation output from the first simulation as an input to the second simulation;

operating on the first simulation output in the second simulation to produce a modified first simulation output; and combining the modified first simulation output and the simulation output of the second simulation to produce a integrated simulation output.

11. The method of claim 10 further comprising rendering the integrated simulation output to produce a frame of data for display.

12. The method of claim 10 further comprising providing the integrated simulation output for a given time to a next action in the second simulation.

13. The method of claim 10 further comprising providing only the simulation output from the second simulation at a given time to a next action in the second simulation.

14. A method of integrating independent simulations to produce a multi-level simulation comprising:

defining a first and second simulation, each simulation running concurrently and including one or more actions defining a progression of a simulation over time, each simulation including a simulation output reflective of a state of a simulation at prescribed times during the simulation; and defining an interaction between the first and second simulations including, providing the simulation output from the first simulation as an input to the second simulation;

operating on the first simulation output in the second simulation including applying one or more actions associated with the second simulation to the first simulation output to produce a modified first simulation output;

combining the modified first simulation output and the simulation output of the second simulation to produce an integrated simulation output; and rendering the integrated simulation output to produce a frame of data for display.

15. A method of integrating two independent simulations comprising:

providing a first and second layer where each layer specifies separate but concurrent simulations and includes one or more actions defining a progression of a simulation over a plurality of time intervals, each time interval having an associated layer state input, one or more functions, and a resultant layer state output where the application of the one or more functions to the layer state input results in the resultant layer state output at a given time interval; and defining an interaction between the first and second simulations including,
  providing as an input to a second layer a first layer's resultant state output;
  operating on the first layer's resultant state output including applying actions specified in the second layer to the first layer's resultant state output to produce a modified resultant state output; and
  combining the resultant state output for the second layer with the modified resultant state output to produce an integrated simulation state output; and rendering the integrated simulation state output producing a frame for display.

16. The method of claim 15 where the combining step copies the resultant state output without affecting output produced by the second layer.

17. The method of claim 15 further comprising rendering either of the resultant state outputs for the first or second layer to reflect the state of either simulation at a given time.

18. The method of claim 15 where step of rendering includes displaying an image representative of an interaction of the first and second layers at a particular time.

19. A simulation tool for providing multi-level simulations of concurrently running simulations comprising:
  a simulation engine operable to designate a first and second simulation each including a simulation output, to copy a simulation output from a first simulation and provide the copy of the first simulation output to the second simulation resulting in an application of one or more actions specified in the second simulation at a same time interval to the copy to produce a modified simulation output, and to combine the modified simulation output and a simulation output from the second simulation in a predefined time interval to produce an integrated simulation output without affecting the simulation output from the first simulation; and
  a render designation tool for designating one or more times for rendering the integrated simulation output to produce a frame for display representative of the interaction of the first and second simulations.

20. A method for animating an object comprising:
selecting a property of an object to animate;
animating the property over a time interval including updating a value of the property;
defining and animating an ephemeral property of the object over the time interval where the value of the ephemeral property is determined from a value of the property at a same time and an associated function;
running a first simulation simulating an animation of the property producing a first simulation output reflective of a state of the first simulation at predefined times;
running a second simulation concurrently simulating an animation of the ephemeral property producing a second simulation output reflective of a state of the second simulation at the predefined times without affecting the state of the first simulation;
rendering a frame of data at the predefined times during the time interval using the second simulation output,
wherein animating the ephemeral property of the object includes reverting the ephemeral property of the object to an original value after each frame of data is rendered, and wherein the ephemeral property is animated for each individual frame without affecting underlying values of the property produced by the first animation.

21. The method of claim 1, wherein actions of the first plurality of actions and the second plurality of actions are selected from the group consisting of actions defining applications of an effect to an object, actions defining motion of an object in a display space, and actions manipulating one or more properties associated with an object.

22. A computer program product for integrating two independent simulations, the product comprising instructions operable to cause a programmable processor to:
  run a first simulation simulating changes in a first object over time, the first simulation including one or more first actions to be applied to the first object during the first simulation, the first simulation further including a first simulation output reflective of a state of the first simulation at one or more predefined times;
  run a second simulation concurrently simulating changes in a second object over time, the second simulation including one or more second actions to be applied to the second object during the second simulation; and
  define an interaction between the first and second simulations including applying one or more second actions associated with the second simulation to the first object, the interaction between the first and second simulations resulting in an integrated simulation output without the first simulation state.

23. The product of claim 22, wherein the second simulation provides a second simulation output reflective of a state of the second simulation at one or more predefined times.

24. The product of claim 23, wherein the instructions to define an interaction results in the integrated simulation output without affecting the second simulation state.

25. The product of claim 23, wherein the integrated simulation output combines the second simulation output and a modified first simulation output, the modified first simulation output being produced by the operation of the second simulation on the first simulation output.

26. The product of claim 23, further comprising instructions operable to cause a programmable processor to:
  run a third simulation concurrently simulating changes in a third object over time where the third simulation provides a third simulation output reflective of a state of the third simulation at one or more predefined times; and
  define an interaction between the first, second and third simulations resulting in a second integrated simulation output without affecting the first or the second simulation state.

27. The product of claim 26, wherein the second integrated simulation output combines the third simulation output and a modified first integrated simulation output, the modified first integration simulation output being produced by the operation of the third simulation on the integrated simulation output.

28. The product of claim 22, wherein actions of the first plurality of actions and the second plurality of actions are selected from the group consisting of actions defining applications of an effect to an object, actions defining motion of an object in a display space, and actions manipulating one or more properties associated with an object.

29. The product of claim 22, wherein each of the first and second simulations simulate the animation of a layer in a multi-layer composition.

30. The product of claim 22, wherein the second simulation animates a property of the first object associated with the first simulation.

31. A computer program product for integrating independent simulations, the product comprising instructions operable to cause a programmable processor to:
  define a first and second simulation, each simulation running concurrently and including one or more actions defining a progression of a simulation over time, each simulation including a simulation output reflective of a state of a simulation at prescribed times intervals during the simulation; and
  define an interaction between the first and second simulations including a direction of influence, where the direction of influence defines how the simulation output from the first simulation is combined with the simulation output from the second simulation at one or more of the prescribed time intervals in the second simulation to prevent a flow error.

32. The product of claim 31, wherein the instructions to define an interaction include instructions to cause a programmable to:
  provide the simulation output from the first simulation as an input to the second simulation;
  operate on the first simulation output in the second simulation to produce a modified first simulation output; and
  combine the modified first simulation output and the simulation output of the second simulation to produce an integrated simulation output.

33. The product of claim 32, further comprising instructions operable to cause a programmable processor to render the integrated simulation output to produce a frame of data for display.

34. The product of claim 32, further comprising instructions operable to cause a programmable processor to provide the integrated simulation output for a given time to a next action in the second simulation.

35. The product of claim 32, further comprising instructions operable to cause a programmable processor to provide only the simulation output from the second simulation at a given time to a next action in the second simulation.

36. A computer program product for integrating independent simulations to produce a multi-level simulation, the product comprising instructions operable to cause a programmable processor to:
  define a first and second simulation, each simulation running concurrently and including one or more actions defining a progression of a simulation over time, each simulation including a simulation output reflective of a state of a simulation at prescribed times during the simulation; and
  defining an interaction between the first and second simulations including,
  providing the simulation output from the first simulation as an input to the second simulation;
    operating on the first simulation output in the second simulation including applying one or more actions associated with the second simulation to the first simulation output to produce a modified first simulation output;
    combining the modified first simulation output and the simulation output of the second simulation to produce an integrated simulation output; and rendering the integrated simulation output to produce a frame of data for display.

37. A computer program product for integrating two independent simulations, the product comprising instructions operable to cause a programmable processor to:
  provide a first and second layer where each layer specifies separate but concurrent simulations and includes one or more actions defining a progression of a simulation over a plurality of time intervals, each time interval having an associated layer state input, one or more functions, and a resultant layer state output where the application of the one or more functions to the layer state input results in the resultant layer state output at a given time interval; and
  define an interaction between the first and second simulations including,
    provide as an input to a second layer a first layer's resultant state output;
    operate on the first layer's resultant state output including applying actions specified in the second layer to the first layer's resultant state output to produce a modified resultant state output; and
    combine the resultant state output for the second layer with the modified resultant state output to produce an integrated simulation state output; and render the integrated simulation state output producing a frame for display.

38. The product of claim 37, wherein the instruction to combine includes instructions to cause a programmable to copy the resultant state output without affecting output produced by the second layer.

39. The product of claim 37, further comprising instructions operable to cause a programmable processor to render either of the resultant state outputs for the first or second layer to reflect the state of either simulation at a given time.

40. The product of claim 37, wherein the instruction to render includes instructions to cause a programmable to display an image representative of an interaction of the first and second layers at a particular time.

41. A computer program product for animating an object, the product comprising instructions operable to cause a programmable processor to:
  select a property of an object to animate;
  animate the property over a time interval including updating a value of the property;
  define and animate an ephemeral property of the object over the time interval where the value of the ephemeral property is determined from the value of the property at a same time and an associated function;
  run a first simulation simulating an animation of the property producing a first simulation output reflective of a state of the first simulation at predefined times;
  run a second simulation concurrently simulating an animation of the ephemeral property producing a second simulation output reflective of a state of the second simulation at the predefined times without affecting the state of the first simulation;
  render a frame of data at the predefined times during the time interval using the second simulation output,
  wherein the instruction to animate the ephemeral property of the object include an instruction to cause a programmable processor to revert the ephemeral property of the object to an original value after each frame of data is rendered, and wherein the ephemeral property is animated for each individual frame without affecting underlying values of the property produced by the first animation.

* * * * *

UNITED STATES PATENT AND TRADEMARK OFFICE
CERTIFICATE OF CORRECTION

PATENT NO. : 6,683,613 B1 Page 1 of 1
DATED : January 27, 2004
INVENTOR(S) : David F. Herbstman, David P. Simons and Daniel M. Wilk It is certified that error appears in the above-identified patent and that said Letters Patent is hereby corrected as shown below:

Column 10,
Line 10, please delete "times" and insert -- time -- therefor.

Column 12,
Line 34, please add -- affecting -- after "without".

Signed and Sealed this

Twentieth Day of April, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,683,613 B1
DATED : January 27, 2004
INVENTOR(S) : David F. Herbstman, David P. Simons and Daniel M. Wilk It is certified that error appears in the above-identified patent and that said Letters Patent is hereby corrected as shown below:

<u>Column 12,</u>
Line 27, please insert -- affecting -- after "without".

Signed and Sealed this

Twenty-ninth Day of June, 2004

JON W. DUDAS
*Acting Director of the United States Patent and Trademark Office*